United States Patent [19]
Perry et al.

[11] Patent Number: 5,960,016
[45] Date of Patent: Sep. 28, 1999

[54] ABERRATION-FREE, ALL-REFLECTIVE LASER PULSE STRETCHER

[75] Inventors: Michael D. Perry; Paul S. Banks, both of Livermore; Brent C. Stuart, Fremont; Scott N. Fochs, Livermore, all of Calif.

[73] Assignee: The Regents of the University of California, Oakland, Calif.

[21] Appl. No.: 08/869,345

[22] Filed: Jun. 5, 1997

[51] Int. Cl.[6] .................................................. H01S 3/1055
[52] U.S. Cl. ........................... 372/25; 359/572; 372/99; 372/102
[58] Field of Search .................................. 372/15, 20, 25, 372/30, 99, 102, 107, 108; 359/326, 330, 346–348, 566, 570, 572

[56] References Cited

U.S. PATENT DOCUMENTS

| | | | |
|---|---|---|---|
| 3,569,996 | 3/1971 | Goell et al. | 359/326 X |
| 3,748,015 | 7/1973 | Offner | 350/55 |
| 3,902,130 | 8/1975 | Pike | 359/348 |
| 4,901,323 | 2/1990 | Hawkins et al. | 372/25 |
| 5,329,398 | 7/1994 | Lai et al. | 359/566 |
| 5,349,591 | 9/1994 | Weston et al. | 372/25 |
| 5,572,355 | 11/1996 | Cotton et al. | 359/346 X |
| 5,644,424 | 7/1997 | Backus et al. | 359/347 |

OTHER PUBLICATIONS

M. Pessot et al., "1000 Times Expansion/Compression of Optical Pulses for Chirped Pulse Amplification," Optics Communications, vol. 62, No. 6, pp. 419–422, Jun. 15, 1987.

Oscar Eduardo Martinez, "3000 Times Grating Compressor with Positive Group Velocity Dispersion: Application to Fiber Compensation in 1.3–1.6 μm Region," IEEE Journal of Quantum Electronics, vol. QE–23, No. 1, pp.59–64, Jan. 1987.

Michael D. Perry and Gerard Mourou, "Terawatt to Petawatt Subpicosecond Lasers," Science, vol. 264, pp. 917–924, May 13, 1994.

B. E. Lemoff and C. P. J. Barty, "Quintic–phase–limited, spatially uniform expansion and recompression of ultrashort optical pulses," Optics Letters, vol. 18, No. 19, pp. 1651–1653, Oct.1,1993.

J. V. Rudd et al., "Chirped–pulse amplification of 55–fs pulses at a 1–kHz repetition rate in Ti:Al$_2$O$_3$ regenerative amplifier, " Optic Letters, vol. 18, No. 23, pp. 2044–2046, Dec. 1, 1993.

C. Fiorini et al., "Temporal Aberrations Due to Misalignments of a Stretcher–Compressor System and Compension," IEEE Journal of Quantum Electronics, vol.30, No. 7, pp. 1662–1670, Jul. 1994.

Detao Du et al., "Terawatt Ti:sapphire laser with a spherical reflective–optic pulse expander," Optics Letters, vol. 20, No. 20, pp. 2114–2116, Oct. 15, 1995.

G. Cheriaux et al., "Aberration–free stretcher design for ultrashort–pulse amplification," Optics Letters, vol. 21, No. 6, pp. 414–416, Mar. 15, 1996.

F. G. Patterson and M. D. Perry, "Design and performance of a multiterawatt, subpicosecond neodymium:glass laser," J. Opt. Soc. Am. B, vol. 8, No. 11, pp. 2384–2391, Nov. 1991.

*Primary Examiner*—John D. Lee
*Attorney, Agent, or Firm*—John P. Wooldridge

[57] ABSTRACT

An all-reflective pulse stretcher for laser systems employing chirped-pulse amplification enables on-axis use of the focusing mirror which results in ease of use, significantly decreased sensitivity to alignment and near aberration-free performance. By using a new type of diffraction grating which contains a mirror incorporated into the grating, the stretcher contains only three elements: 1) the grating, 2) a spherical or parabolic focusing mirror, and 3) a flat mirror. Addition of a fourth component, a retro-reflector, enables multiple passes of the same stretcher resulting in stretching ratios beyond the current state of the art in a simple and compact design. The pulse stretcher has been used to stretch pulses from 20 fsec to over 600 psec (a stretching ratio in excess of 30,000).

24 Claims, 4 Drawing Sheets

ABERRATION-FREE, ALL-REFLECTIVE LASER PULSE STRETCHER

The United States Government has rights in this, invention pursuant to Contract No. W-7405-ENG48 between the United States Department of Energy and the University of California for the operation of Lawrence Livermore National Laboratory.

BACKGROUND OF THE INVENTION

1. Field of the Invention

The present invention relates to amplification of ultrashort-pulses, and more specifically, it relates to means for stretching ultra-short pulses prior to amplification.

2. Description of Related Art

In recent years, amplification of ultrashort optical pulses using the technique of chirped-pulse amplification (CPA) has become commonplace. With this technique, high energy, ultrashort pulses are made possible by first stretching the pulse in time, amplifying it, and finally recompressing it temporally. This technique has made possible the production of terawatt and now even petawatt class femtosecond lasers (see M. D. Perry, and Gerard Mourou, "Terawatt to Petawatt Subpicosecond Lasers," Science, Vol. 264, pp. 917–924 (May 13, 1994)). In these CPA laser systems, it is required to stretch ultrashort-pulses (or pulses having sufficient bandwidth to become ultrashort) prior to amplification. An ultrashort-pulse is one having a duration in the range of 5 femtoseconds to 50 picoseconds. Typically the pulse is stretched several thousand times to a duration typically greater than 100 picoseconds prior to injection into the amplifier system. Following the stretcher, the pulse is then amplified to high energies and recompressed to optimally its original temporal length.

A key element in such systems is the pulse stretcher (or pulse expander) which, in early designs, was composed of a pair of diffraction gratings separated by a 1-to-1 telescope (see O. E. Martinez, IEEE Journal of Quantum Electronics, Vol. QE-23 No. 1, pp. 59–64 January 1987), and M. Pessot, P. Maine, and G. Mourou, "1000 Times Expansion/Compression Of Optical Pulses For Chirped-Pulse Amplification," Optics Communications, Vol. 62 No. 6, 419–422 Jun. 15, 1987)). However, due to a sensitivity to grating alignment, these double grating designs were replaced with a folded design using a single grating and lens with a mirror at the Fourier plane (see M. D. Perry and F. G. Patterson, "Design and Performance of a 10 Tw Nd:Glass Laser System Based on Chirped Pulse Amplification," Conference on Lasers and Electrooptics, Baltimore, Md., May 1989). These early pulse stretchers (and numerous derivatives of these basic designs, e.g., J. Weston, et al, "Laser Pulse Stretcher and Compressor With Single Parameter Wavelength Tunability," U.S. Pat. No. 5,349,591) used refractive optics (lenses) and performed well for most CPA systems where the final pulse width was greater than approximately 100 femtoseconds. As CPA systems continued to evolve to shorter pulse durations, however, the large spectral bandwidths and large stretching ratios involved demanded a change from these stretcher designs due to chromatic aberration in the refractive optics.

Chromatic aberration in these systems limits the stretching ratio achievable and the duration and contrast of the recompressed pulse. In most CPA systems, it is the pulse stretcher which dominates the chromatic aberration. Chromatic aberration is most easily minimized by eliminating the use of refractive components (e.g., lenses) in the optical design of the pulse stretcher. This has led to the development of numerous all-reflective designs or designs which employ achromatic lenses. These designs improve, but do not eliminate, the chromatic aberration. This is a result of the fact that although the focusing mirror (or lens) may be achromatic, the stretcher as an optical device is not due to the dispersion of the grating. Furthermore, other optical aberrations such as spherical aberration, coma, astigmatism and vignetting are present in stretcher designs. (There are numerous analyses of the effects of aberrations on stretcher performance in the literature. One good (but highly technical) example is C. Fiorini, et al, "Temporal Aberrations Due to Misalignments of a Stretcher-Compressor System," IEEE Journal of Quantum Electronics Vol. 30 No. 7, pp. 1662–1670 (July 1994)). These aberrations can be as detrimental to the performance of the laser system as chromatic aberration.

The diffraction grating employed in the stretcher disperses the various wavelength components in the laser pulse along different angles (this is the key to pulse stretching in the first place). The chromatic aberration of the pulse stretcher, and in fact, the overall performance of the laser system itself, is determined by the ability of the stretcher to propagate the different frequency components along widely varying paths within the stretcher and reassemble them into a well collimated beam with minimal phase aberration and no spatial chirp. Spatial chirp refers to the case where a broad-bandwidth laser beam has a non-uniform distribution of frequency-components across the beam cross section.

In order to minimize chromatic aberration, several all-reflective stretcher designs have been developed (see B. E. Lemoff and. C. P. J. Barty, Optics Letters, Vol. 18 No. 19 pp. 1651–1653 (Oct. 1, 1993), and J. V. Rudd, et al, Optics Letters, Vol. 18 No. 23, pp. 2044–2046 (Dec. 1, 1993)). These designs either employ large special optics, are limited in the stretching ratio (typically to less than 400 psec), are used off-axis, and involve a large number of elements (see B. E. Lemoff and C. P. J. Barty, Optics Letters, Vol. 18, p. 1651 (1993)) which complicate alignment. As mentioned previously, these designs are aberration-free only in regards to the lack of chromatic aberration in the reflective mirrors. They still contain the other optical aberrations. The only stretcher design in which all optical aberrations up to third-order are indeed zero (for a monochromatic beam) are those based on the Offner optical triplet (see A. Offner, U.S. Pat. No. 3,748,015 (1973)). These stretcher designs (see D. Du, et al, "Terawatt Ti:Sapphire Laser with a Spherical Reflective-Optic Pulse Expander," Optics Letters, Vol. 20 No. 20, pp. 2114–2116 (Oct. 15, 1995), and G. Cheriaux, et al, "Aberration-Free Stretcher Design for Ultrashort-Pulse Amplification," Optics Letters, Vol. 21 No. 6, pp. 414–416 (Mar. 15, 1996)) provide an optically aberration-free unit magnification telescope within the stretcher and as such represent the most advanced current art. These Offner-based designs require a pair of extremely high optical quality, matched curved mirrors and exhibit extreme sensitivity to alignment.

To date, the stretchers employing either achromatic lenses or reflective elements (parabolic or spherical mirrors) suffer from one or all of the following: they (i) still contain significant chromatic and/or optical aberration as a result of off-axis use of the focusing element, (ii) provide low stretching ratios, (iii) are extremely complex involving a number of elements, (iv) exhibit extreme sensitivity to alignment and/or (v) employ very expensive aberration corrected optical elements.

SUMMARY OF THE INVENTION

It is an object of the present invention to provide a simple, aberration-free, all-reflective stretcher for chirped-pulse amplification.

It is another object of the present invention to provide an aberration-free, all-reflective stretcher.

Another object of the present invention is to provide a high dispersion spectrometer such as an air or space borne spectrographic instrument.

Still another object is to provide an input device for smoothing spectral dispersion in fusion laser systems.

The present invention addresses all of the limitations of the prior art by providing for the largest possible stretching ratio in a compact, simple and inexpensive device employing only three (or four if a retroreflector is also employed) optical elements: a grating, spherical mirror and flat mirror. The present invention exhibits minimal optical and chromatic aberration by employing all-reflective optics which are used on-axis. The device is insensitive to alignment since the grating and fold are incorporated on the same optic and can therefore not be misaligned. The all-reflective laser pulse stretcher comprises a curved mirror which may have a parabolic or spherical shape, a flat mirror that is positioned at the focal plane of the curved mirror, and a grating/mirror composite which has a horizontally formed mirror stripe across its center. This stripe is bounded on its upper and lower sides by a grating. The optics of the pulse stretcher are positioned in an optical assembly such that an initially Fourier transform-limited laser pulse will be stretched temporally or alternatively that a negatively chirped-pulse would be compressed in time.

The invention is designed primarily to produce stretched pulses for use in chirped-pulse amplification laser systems. Specifically to increase the duration of picosecond or femtosecond pulses to a duration long enough for efficient amplification. With this invention, large stretching ratios (typically the pulses are stretched from 10–1000 femtoseconds to over 600 picoseconds) can be achieved in a compact geometry. The device is applicable to all chirped-pulse amplification lasers: solid-state, dye, gas or excimer.

The device can also be used as a high dispersion spectrometer, or in fact, in any application where extremely high dispersion in a compact geometry with near aberration-free performance is required. In addition to providing a simple, easy to use and inexpensive pulse stretcher for CPA laser systems, the same features described above will make the invention attractive for use as a spectroscopic instrument.

DETAILED DESCRIPTION OF THE INVENTION

The present invention is an easily aligned, all-reflective, on-axis, aberration-free pulse stretcher with only four elements that has a stretching ratio easily exceeding 10,000 in a compact geometry. The effect of off-axis aberrations resulting from grating dispersion can be eliminated in the present invention by using a spherical mirror or by slightly bending the roof mirror in the system. Additionally, the pulse stretcher is designed specifically for ease of alignment and insensitivity to slight errors in alignment.

Figure 1A:
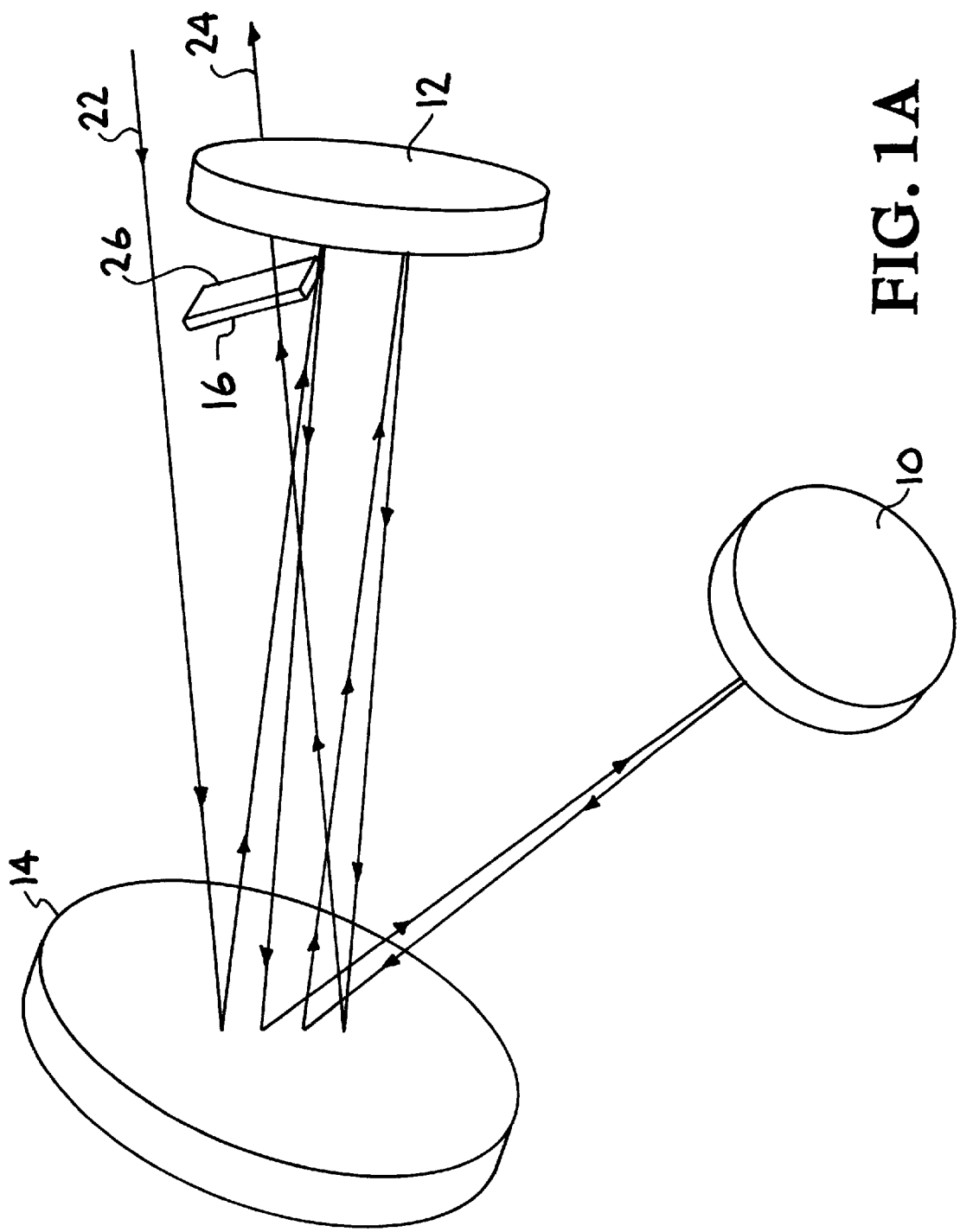
FIG. 1A shows a 4 element pulse stretcher of the present invention.
Figure 1B:
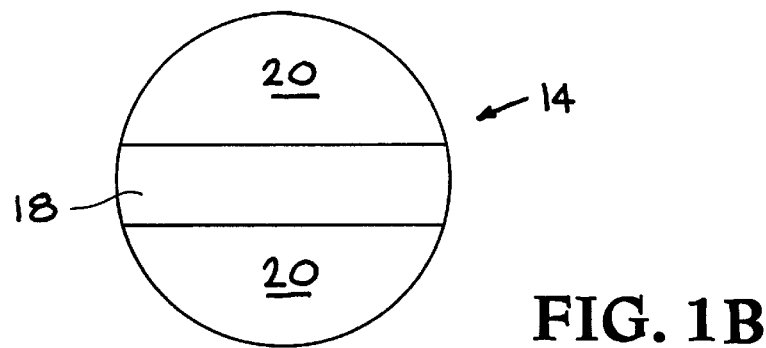
FIG. 1B shows a front view of the grating/mirror of FIG. 1A.

The pulse stretcher of the present invention is shown in FIG. 1A. In one embodiment, the components are a 6" diameter gold flat mirror 10 at the focal plane of a 113 cm focal length, 8" diameter parabolic (or spherical) gold mirror 12, a 12" diameter grating/mirror composite 14, and a roof mirror 16 which displaces the beam vertically for a second pass through the stretcher. The flat mirror 10 is positioned at the focal plane of the curved mirror 12, thereby forming a unit magnification telescope upon retroreflection. The stretcher telescope can be formed using a parabolic mirror 12 in order to eliminate all on-axis aberrations or a spherical mirror 12 to minimize off-axis, frequency-dependent phase aberrations associated with the dispersion of the grating. Referring to FIG. 1B, grating 14 is a composite where a mirror stripe 18 has been placed horizontally across the center of a holographically-produced, 1480 l/mm, broadband metallic grating 20. This stripe 18 acts as the fold mirror necessary to direct the beam to the flat mirror 10 placed in the focal plane of the parabolic mirror 12.

Figure 1C:
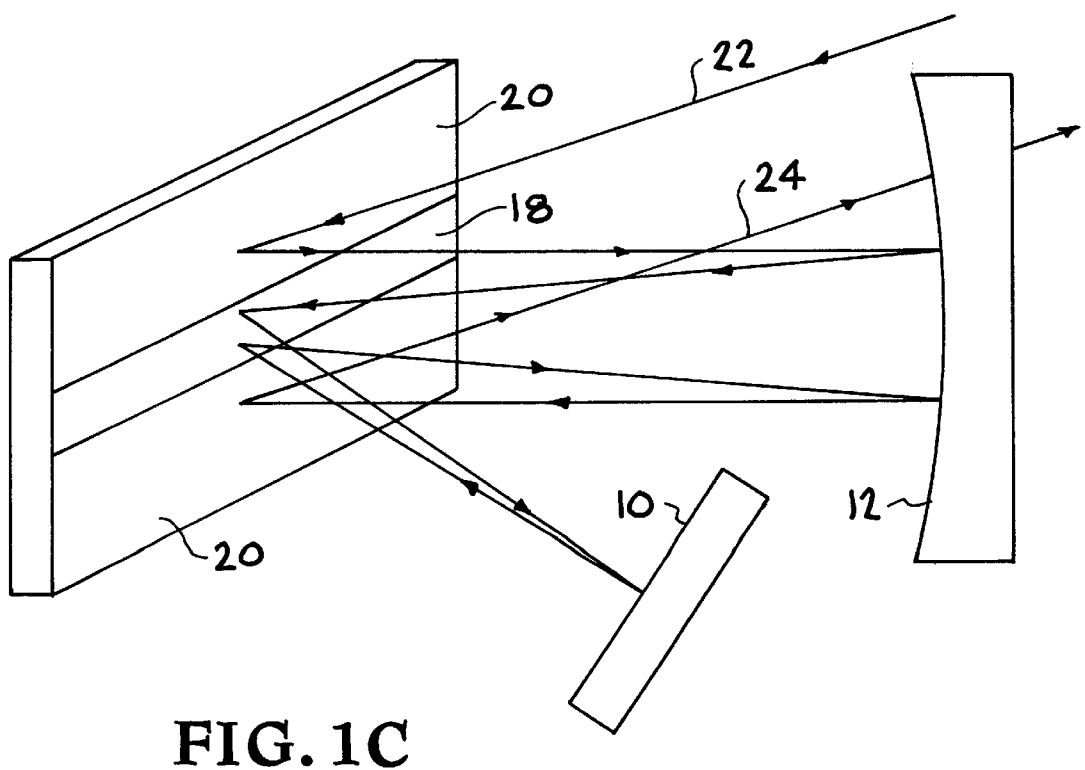
FIG. 1C shows a view of the beam path through the pulse stretcher.

Referring to FIGS. 1A and 1C, the input beam 22 strikes the grating/mirror composite 14 slightly above the mirror stripe 18 on the grating 20 and is diffracted to the curved (parabolic or spherical) mirror 12. The curved mirror 12 reflects the dispersed beam at a slight downward angle so that it strikes the mirror stripe 18. The converging beam is reflected from mirror stripe 18 to the flat mirror 10 at the focus of the curved mirror 12. Reflection from the flat mirror 10 repeats this sequence in reverse order, only on the lower half of the optics. The stretched beam 24 exits the stretcher assembly vertically displaced from its incident location. At this point, it may be sent back into the pulse stretcher by a roof mirror assembly 26 for a second pass through the stretcher.

The input angle is chosen to be near the Littrow angle for the grating selected and wavelength range with which the device will be used. Calculations and measurements indicate that small errors in alignment have only a slight effect on the phase and spatial distribution of the laser pulse output. Only the position of the flat mirror 10 must be set precisely to within the depth of field of the focal plane of curved mirror 12. The ease and insensitivity of alignment come from the fact that the fold mirror 18 and grating 20 are all on the same optic. Pulse stretchers are extremely sensitive to any relative angle between the gratings which comprise the stretcher (or the fold path in a single grating system). Since "both" the grating 20 and the fold mirror 18 are all fabricated as a single optic 14, it is impossible to have any relative misalignment between these components. That this design also reduces the total number of stretcher components to three (four if the roof mirror 26 is included) leads to an extremely simple and easy alignment.

Figure 2A:
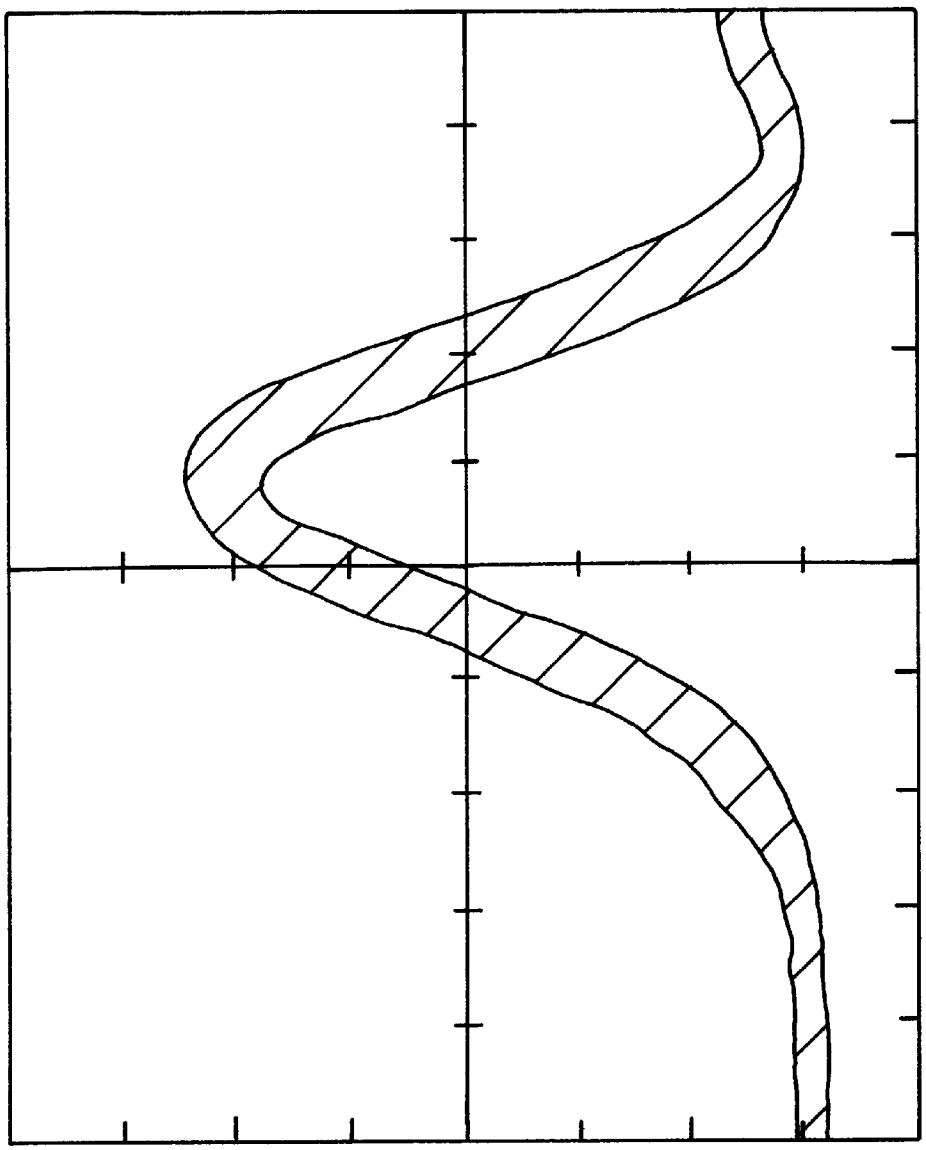
FIG. 2A shows the temporal shape of a stretched pulse measured with a fast photodiode and sampling head.
Figure 2B:
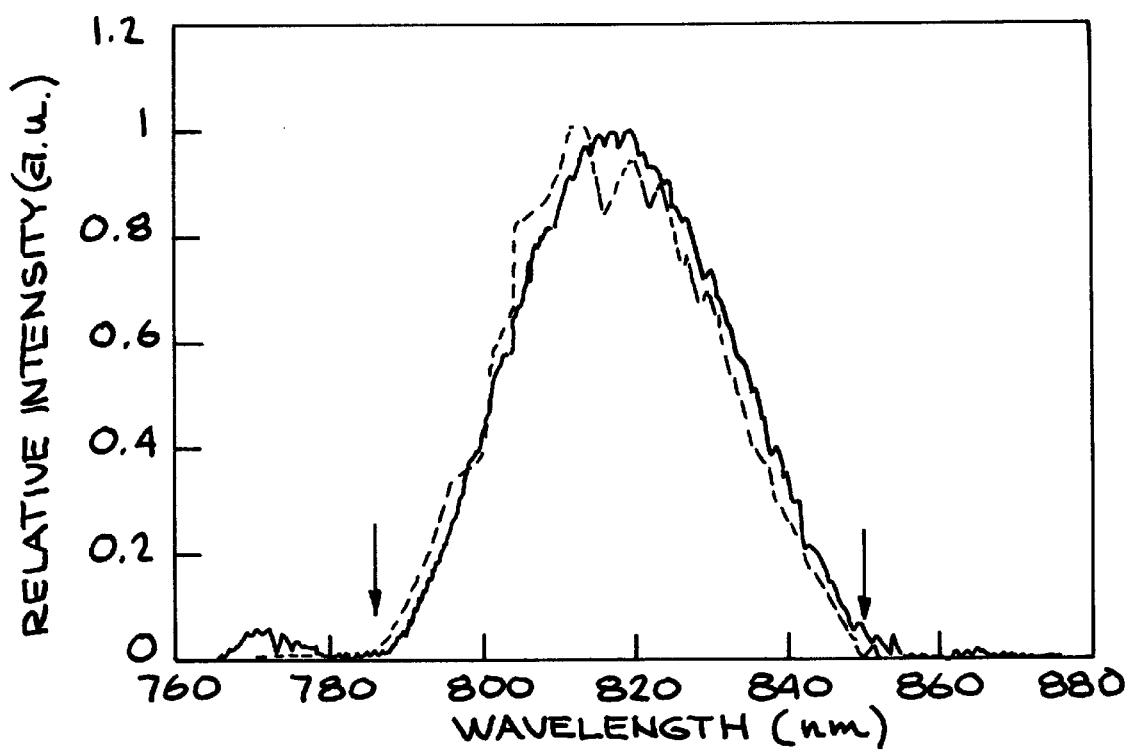
FIG. 2B shows the bandpass of a pulse stretcher.

In one embodiment, the focal length of the paraboloid 12 is chosen to stretch 30 fs (FWHM) pulses (from e.g., a Ti:sapphire oscillator) to 600 ps (a stretching ratio of 20,000). FIG. 2A shows the stretched pulse as measured using a fast avalanche photodiode. As shown in FIG. 2B, the spectral throughput of this embodiment of the pulse stretcher is approximately 60 nm, with the limiting aperture being the parabolic mirror 1.2. Clipping the spectrum at 60 nm has little effect on the compressed temporal pulse shape for this embodiment since the final Gaussian spectrum is narrowed to less than 25 nm by spectral narrowing in the amplifiers.

The stretcher design itself is not limited to this bandpass, however, and can be used for much shorter pulses with different choices of optic sizes and focal lengths. In fact, ray tracing calculations indicate that a spectral throughput in excess of 120 nm is possible by reducing the focal length of the curved mirror 12 to about 80 cm. It should be noted that the 12" diameter for the mirror/grating composite 14 is not necessary for the design, but was the size of a standard substrate and was used strictly for convenience. Rectangular grating/mirror composites have also been used in variations of the invention.

Exact ray tracing analysis shows that the configuration of the present invention produces a stretched pulse with a temporal phase function which is exactly equal to but opposite in sign to a matched grating pair up to the third order. Specifically, the phase term of the electric field of the broadband laser pulse can be written as a Taylor expansion around the central frequency $\omega_o$ as, $$\phi(\omega) = \phi(\omega_0) + \beta_1(\omega - \omega_0) + \frac{\beta_2(\omega - \omega_0)^2}{2!} + \frac{\beta_3(\omega - \omega_0)^3}{3!} + \frac{\beta_4(\omega - \omega_0)^4}{4!} + \ldots$$

where $\beta_j = \partial_j \Phi / \partial \omega^j$ evaluated at $\omega = \omega_o$. However, the fourth order term was 15% larger than that calculated for a grating pair ($6.4 \times 10^7$ fs$^4$ vs. $5.6 \times 10^7$ fs$^4$).

The residual phase term is because this design (as well as the designs in the prior art) is only truly aberration-free if the grating is in the focal plane of the parabolic mirror and therefore providing zero pulse stretching. When the grating is not in the focal plane, the dispersed beam strikes the curved mirror as a diverging beam, and thus off-axis. This induces a spectral divergence, both horizontal and vertical, where the different frequency components are no longer collinear after striking the grating the second (and fourth) time. This spectral divergence can be eliminated completely by reflecting the rays back into the stretcher along the same path in the horizontal plane. This can be accomplished by providing a slight curvature to the mirror 10 in the focal plane of the curved optic. This curvature is only in the horizontal plane and can be either polished into the surface or achieved by bending the substrate.

For stretching pulses of initial duration less than approximately 50 fsec, a spherical mirror will provide better performance at location 12 than a parabolic mirror of the same focal length. the residual fourth order phase term was reduced greatly. While this is no longer an on-axis aberration-free design, the now present spherical aberration compensates for the spectral divergence induced by the grating being away from the focal plane. As a result, the frequency components are more collinear than for the case with the parabolic mirror. For a spherical mirror in the above configuration, the fourth order term is $5.5 \times 10^7$ fs$^4$ which is much closer to the grating pair dispersion term ($\beta_4 = 5.6 \times 10^7$ fs$^4$) as is the fifth order term. In fact, when the material dispersion from a typical Titanium-sapphire based amplifier chain is included, the phase terms which are uncompensated by a matched grating pair compressor (residual fourth and fifth order terms) correspond to less than 1 femtosecond broadening of a 40 femtosecond pulse. Total elimination of the residual fourth order phase terms can be accomplished by carefully adjusting the amount of material in the amplifier system or by changing the groove spacing of the compressor (e.g., from 1480 lines/mm to 1450 l/mm). This simultaneously reduces the residual fifth order term to approximately $10^5$ fs$^5$.

Figure 3:
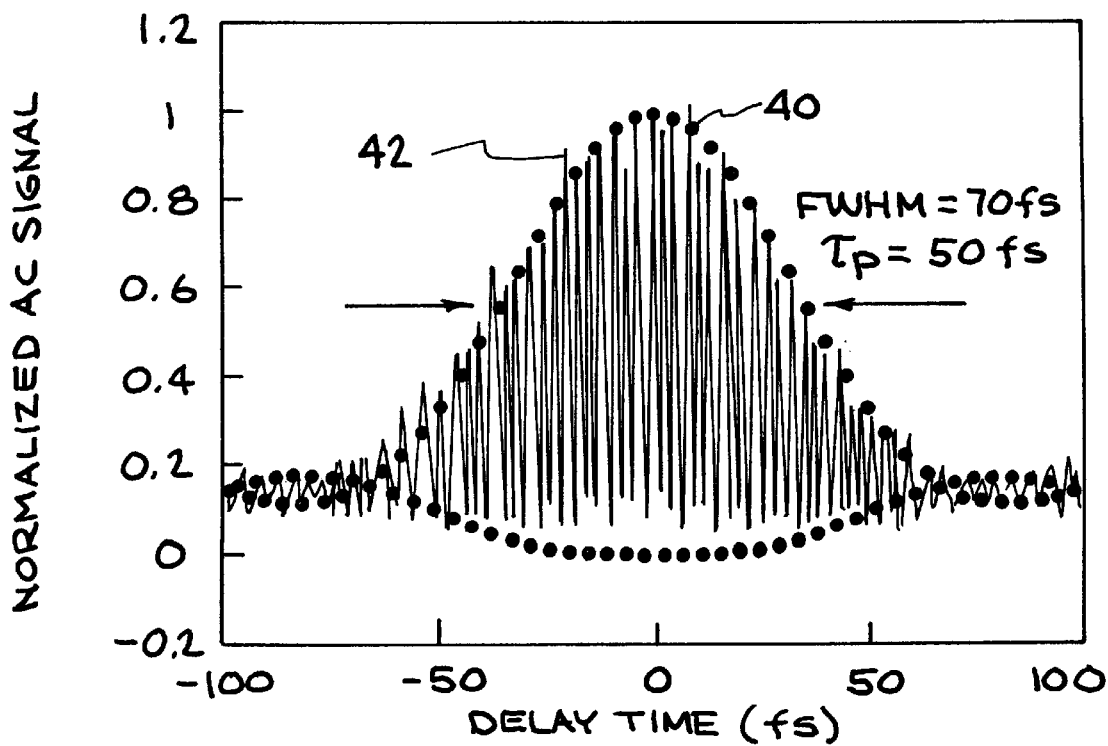
FIG. 3 shows an interferometric autocorrelation of a pulse stretched and recompressed using the present invention.

An example of the performance of the device with a chirped-pulse amplified titanium-doped sapphire laser system is shown in FIG. 3. Here, we used the design shown in FIG. 1 with a spherical mirror 12 possessing a radius of curvature of 172 cm and a 1480 lines/mm grating/mirror composite 14. With this focal length, the bandpass of the stretcher was approximately 90 nm with the limiting aperture being the 6" flat mirror 10. FIG. 3 shows the calculated autocorrelation envelope (circles 40) compared to the measured autocorrelation trace of the unamplified pulse (42). This trace corresponds to a pulse length of approximately 42 femtoseconds with a negligible amount of residual chirp.

The present invention is a simple design for an all-reflective pulse stretcher for use in CPA systems. The advantages are that it is easily aligned, relatively insensitive to misalignment, contains the minimum possible number of optics, involves only simple and inexpensive curved optics and produces a large stretching ratio in a compact geometry. Using a spherical mirror for the curved mirror 12 will produce smaller uncompensated phase terms than an on-axis aberration-free design using a parabolic mirror. With the design of the present invention, it is possible to exactly compensate second through fourth order phase terms using a combination of material dispersion in the system and changing the line spacing of the compressor grating.

Changes and modifications in the specifically described embodiments can be carried out without departing from the scope of the invention, which is intended to be limited by the scope of the appended claims.

The invention claimed is:

1. An all-reflective laser pulse stretcher, comprising:
   a curved mirror selected from a group consisting of a parabolic mirror and a spherical mirror;
   a flat mirror positioned at the focal plane of said curved mirror;
   a grating/mirror composite comprising a mirror portion, a first grating portion and a second grating portion, wherein said first grating portion and said second grating portion are located on opposite sides of said mirror portion,
   wherein said curved mirror, flat mirror and grating/mirror composite are positioned in an optical assembly.

2. The all-reflective stretcher of claim 1, wherein said curved mirror, flat mirror and grating/mirror composite, collectively referred to as optics, are optically positioned such that when a laser pulse is directed to strike said first grating portion such that it will be diffracted to said curved mirror, said curved mirror will reflect said laser pulse so that it strikes said mirror portion, wherein said laser pulse is reflected from said mirror portion to said flat mirror, wherein said laser pulse is reflected from said flat mirror and repeats this sequence in reverse order, on the half of said optics which includes said second grating portion to exit said all-reflective stretcher as a temporally stretched laser pulse.

3. The all-reflective stretcher of claim 2, further comprising a roof mirror positioned to receive said temporally stretched laser pulse and send it back into said all-reflective stretcher.

4. The all-reflective stretcher of claim 3, wherein said optics are configured to be on a single optical axis, wherein said stretcher exhibits minimal optical and chromatic aberration.

5. The all-reflective stretcher of claim 3, wherein the positioning of said flat mirror at said focal plane of said curved mirror forms a unit magnification telescope upon retroreflection.

6. The all-reflective stretcher of claim 3, wherein said curved mirror comprises a parabolic mirror, wherein the positioning of said flat mirror at said focal plane of said parabolic mirror eliminates all on-axis aberrations.

7. The all-reflective stretcher of claim 3, wherein said curved mirror comprises a spherical mirror, wherein the positioning of said flat mirror at said focal plane of said spherical mirror minimizes off-axis, frequency-dependent phase aberrations associated with the dispersion of said grating/mirror composite.

8. The all-reflective stretcher of claim 3, wherein said first grating portion and said second grating portion of said grating/mirror composite each comprise a holographically-produced broadband diffraction grating.

9. The all-reflective stretcher of claim 3, wherein the angle that said laser pulse strikes said first grating portion is chosen to be near the Littrow angle for the grating selected and wavelength range with which said all-reflective stretcher is to be used.

10. The all-reflective laser pulse stretcher of claim 1, wherein said mirror portion comprises a horizontally formed mirror stripe across the center of said grating/mirror composite, wherein said first grating portion comprises an upper grating portion above said mirror stripe, wherein said second grating portion comprises a lower grating portion below said mirror stripe.

11. The all-reflective laser pulse stretcher of claim 1, wherein said curved mirror, flat mirror and grating/mirror composite are positioned in an optical assembly such that an initially Fourier transform-limited laser pulse will be stretched temporally.

12. The all-reflective laser pulse stretcher of claim 1, wherein said curved mirror, flat mirror and grating/mirror composite are positioned in an optical assembly such that a negatively chirped-pulse will be compressed in time.

13. The all-reflective stretcher of claim 1, wherein said curved mirror, flat mirror and grating/mirror composite, collectively referred to as optics, are optically positioned such that when a laser pulse is directed to strike said second grating portion such that it will be diffracted to said curved mirror, said curved mirror will reflect said laser pulse so that it strikes said mirror portion, wherein said laser pulse is reflected from said mirror portion to said flat mirror, wherein said laser pulse is reflected from said flat mirror and repeats this sequence in reverse order, on the half of said optics which includes said first grating portion to exit said all-reflective stretcher as a temporally stretched laser pulse.

14. The all-reflective stretcher of claim 13, further comprising a roof mirror positioned to receive said temporally stretched laser pulse and send it back into said all-reflective stretcher.

15. The all-reflective stretcher of claim 14, wherein said optics are configured to be on a single optical axis, wherein said stretcher exhibits minimal optical and chromatic aberration.

16. The all-reflective stretcher of claim 14, wherein the positioning of said flat mirror at said focal plane of said curved mirror forms a unit magnification telescope upon retroreflection.

17. The all-reflective stretcher of claim 14, wherein said curved mirror comprises a parabolic mirror, wherein the positioning of said flat mirror at said focal plane of said parabolic mirror eliminates all on-axis aberrations.

18. The all-reflective stretcher of claim 14, wherein said curved mirror comprises a spherical mirror, wherein the positioning of said flat mirror at said focal plane of said spherical mirror minimizes off-axis, frequency-dependent phase aberrations associated with the dispersion of said grating/mirror composite.

19. The all-reflective stretcher of claim 14, wherein said first grating portion and said second grating portion of said grating/mirror composite each comprise a holographically-produced broadband diffraction grating.

20. The all-reflective stretcher of claim 14, wherein the angle that said laser pulse strikes said second grating portion is chosen to be near the Littrow angle for the grating selected and wavelength range with which said all-reflective stretcher is to be used.

21. An all-reflective laser pulse stretcher, comprising:
a parabolic mirror;
a mirror positioned at the focal plane of said parabolic mirror;
a grating/mirror composite comprising a mirror portion, said grating/mirror composite further comprising a first grating portion and a second grating portion, wherein said first grating portion and said second grating portion are located on opposite sides of said mirror portion,
wherein said parabolic mirror, said mirror positioned at the focal plane of said parabolic mirror and said grating/mirror composite are positioned in an optical assembly.

22. The all-reflective stretcher of claim 21, wherein said mirror positioned at the focal plane of said parabolic mirror is selected from a group consisting of a flat mirror and a curved mirror.

23. An all-reflective laser pulse stretcher, comprising:
a spherical mirror;
a mirror positioned at the focal plane of said spherical mirror;
a grating/mirror composite comprising a mirror portion on, said grating/mirror composite further comprising a first grating portion and a second grating portion, wherein said first grating portion and said second grating portion are located on opposite sides of said mirror portion,
wherein said spherical mirror, mirror positioned at the focal plane of said spherical mirror and grating/mirror composite are positioned in an optical assembly.

24. The all-reflective stretcher of claim 23, wherein said mirror positioned at the focal plane of said spherical mirror is selected from a group consisting of a flat mirror and a curved mirror.

* * * * *